United States Patent [19]

Huntington

[11] 4,103,708

[45] Aug. 1, 1978

[54] VENTILATED POPPET DAMPER

[75] Inventor: Robert G. Huntington, Louisville, Ky.

[73] Assignee: American Air Filter Company, Inc., Louisville, Ky.

[21] Appl. No.: 744,195

[22] Filed: Nov. 22, 1976

[51] Int. Cl.² .............................................. F16K 1/00
[52] U.S. Cl. ........................... 137/614.11; 126/285 R; 110/163
[58] Field of Search .................. 110/163; 126/285 A, 126/285 R; 251/172, 294; 277/3, 15, 65; 137/614.11

[56] References Cited

U.S. PATENT DOCUMENTS 558,702  3/1896  Perkins .................................. 137/613
3,895,651  7/1975  Okada et al. ..................... 137/614.11

FOREIGN PATENT DOCUMENTS 16,770 of 1896  United Kingdom ................ 137/614.11

Primary Examiner—Martin P. Schwadron
Assistant Examiner—A. Michael Chambers
Attorney, Agent, or Firm—Jon C. Winger

[57] ABSTRACT

A ventilated poppet damper assembly for use in a gas conveying conduit to selectively allow and prevent the flow of gas through the conduit has a movable pair of spaced apart damper plates which define a transverse chamber when in the closed position. The transverse chamber is vented to insure that there is no leakage of conveyed gas past the closed damper plates.

18 Claims, 10 Drawing Figures

VENTILATED POPPET DAMPER

BACKGROUND OF THE INVENTION

The present invention relates to damper structures, and more particularly to a ventilated damper assembly for use in metallurgical operations.

In large gas-conducting conduit systems such as those used in conjunction with metallurgical operations, it frequently is necessary to provide a damper to control gas flow through the conduit.

In the past, damper assemblies have proven to be complicated and expensive in order to effect positive tight sealing, and in many cases, have not proven entirely effective. Included among the past damper arrangements have been damper plates which slide into and out of a conduit in the manner of a guillotine. A problem with these damper plates is that they move in guiding rails and must fit therein with sufficient clearance to compensate for expansion and contraction of the damper plate to avoid binding. However, these damper plates must also be sized to obtain a gas tight seal when in the closed position. A further problem with sliding damper plates is that they tend to abrate the sealing surfaces of the guiding rails because they slide against them in moving between opened and closed positions. Yet a further drawback with sliding damper plates of the above-described type is that their use is substantially restricted to rectangular shaped conduits.

SUMMARY OF THE INVENTION

The present invention recognizes the problems and drawbacks of prior art dampers and provides a solution which is not only effective, but also relatively inexpensive to manufacture, install, and maintain in operation.

More particularly, the present invention is a ventilated poppet damper assembly for selectively opening and closing the gas stream passageway through a gas conveying conduit, the ventilated damper assembly comprising:

a first peripheral sealing seat disposed within the conduit;

a second peripheral sealing seat disposed within the conduit and spaced downstream, relative to the gas stream flow, from the first peripheral sealing seat;

a hollow close-ended actuating rod coaxially disposed within the conduit and mounted for axial movement therein;

a first damper plate coaxially disposed with the hollow rod and attached thereto proximate one of the rod ends for movement with the rod between an open position spaced from the first peripheral sealing seat and a closed position engaging the first peripheral sealing seat;

a second damper plate coaxially disposed with the hollow rod, spaced downstream, relative to the gas stream flow, from the first damper plate, and attached to the hollow rod for movement therewith between an open position spaced from the second peripheral sealing seat and a closed position engaging the second peripheral sealing seat;

the first and second damper plates cooperating, in the closed position, to define a transverse chamber;

means for axially moving the rod and, therefore, the first and second damper plates between the open and closed positions; and, means for ventilating or pressurizing the transverse chamber through the hollow rod.

BRIEF DESCRIPTION OF THE DRAWINGS

Several advantageous embodiments of the present invention are illustrated in the accompanying drawings, wherein like numerals refer to like parts through, and in which.

DESCRIPTION OF THE PREFERRED EMBODIMENTS

Figure 1:
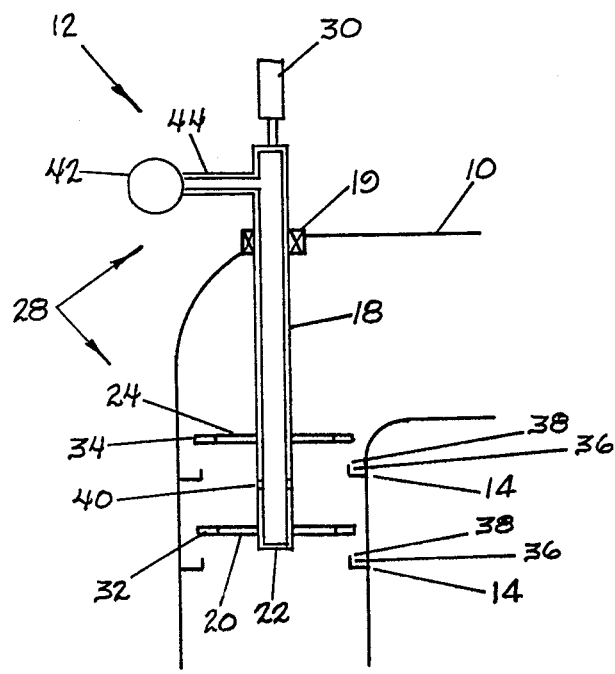
FIG. 1 is a longitudinal cross-sectional view of one advantageous embodiment of the present invention.

FIGS. 1-5 illustrate a gas conveying conduit 10 having a ventilated poppet damper assembly, generally denoted as the numeral 12, disposed therein for selectively opening and closing the gas stream passageway through the conduit 10.

The ventilated poppet damper assembly 12 is comprised of a peripheral sealing seat or flange 14 disposed within the conduit 10 and another peripheral sealing seat or flange 16 spaced from the sealing seat or flange 14. A hollow close-ended activating rod 18 is coaxially disposed within the conduit 10 and is mounted for axial movement. A damper plate 20 is coaxially disposed with the hollow rod 18 and is attached to the rod 18 proximate one of the rod ends 22 for movement with the rod 18 between an open position spaced from the peripheral sealing flange 14 (see FIG. 1) and a closed position engaging the peripheral sealing seat or flange 14 (see FIGS. 2-5). Another damper plate 24 is also coaxially disposed with the hollow rod 18, but is parallel to and spaced a distance from the damper plate 20 along the axis of the rod 18. The distance by which the damper plate 24 is spaced from the damper plate 20 corresponds to the distance that sealing seat or flange 16 is spaced from sealing seat or flange 14. The damper plate 24 is attached to the rod 18 for movement therewith between an open position spaced from the peripheral sealing seat or flange 16 (see FIG. 1) and a closed position engaging the peripheral sealing seat or flange 16 (see FIGS. 2-5). Therefore, the damper plates 20 and 24 move as a unit with the activating rod 18. When the damper plates 20 and 24 are in the closed position, they cooperate to define a transverse chamber 26 (see FIGS. 2-5) across the conduit 10.

The hollow rod 18 extends through the wall of the gas conveying conduit 10 to the exterior of the conduit. A rod seal 19 is disposed around the rod 18 where it passes through the conduit wall to create a gas tight seal to prevent the gas being conveyed in the conduit from leaking out of the conduit 10 past the rod 18.

The ventilated poppet damper assembly 12 further comprises means, generally denoted as the numeral 28, for ventilating the transverse chamber 26 through the hollow rod 18 as well as means 30 for axially moving the hollow rod 18 and, therefore, the damper plates 20 and 24 between their open position and closed position.

The sealing flanges 14 and 16 each comprise a lip 36 attached to the wall of the conduit 10 and having a free upstanding edge 38 for engagement with the flexible margins 32 and 34 of the damper plates 20 and 24, respectively.

The damper plates 20 and 24 comprise a flexible margin 32 and 34, respectively, constituting a peripheral sealing means. When the damper plates 20 and 24 are in their closed positions, the flexible margins 32 and 34 engage the free edge 38 of peripheral sealing seats or flanges 14 and 16, respectively. Preferably, the rod moving means 30 forces the damper plates against their respective sealing seats hard enough to deflect the flexible margins of the damper plates so that a tight seal is created between the flexible margins and the sealing seats.

The flexible margins 32 and 34 can be formed in any one of a number of known ways. For example, the damper plate can be tapered so that the margin is thinner than the rest of the damper plate, or a flexible gasket material can be attached to the periphery of the damper plate to extend outwardly beyond the edge of the damper plate.

In the embodiment of FIGS. 1 through 5, the peripheral sealing seats or flanges 14 and 16 are connected to the interior wall surface of the conduit and comprise a lip having a free edge 38 for engagement with the flexible margins 32 and 34 of the damper plates 20 and 24.

The rod moving means 30 can be any one of a number of conventional known devices such as a pneumatic or hydraulic cylinder and piston, or a solenoid.

The ventilating means 28 comprises at least one aperture 40 formed through the side wall of the hollow rod 18 between the damper plates 20 and 24 thereby providing a gas flow path between the transverse chamber 26 and the interior of the hollow rod 18, and gas moving means 42 in gas flow communication with the interior of the hollow rod 18 via a ventilating conduit 44.

Figure 2:
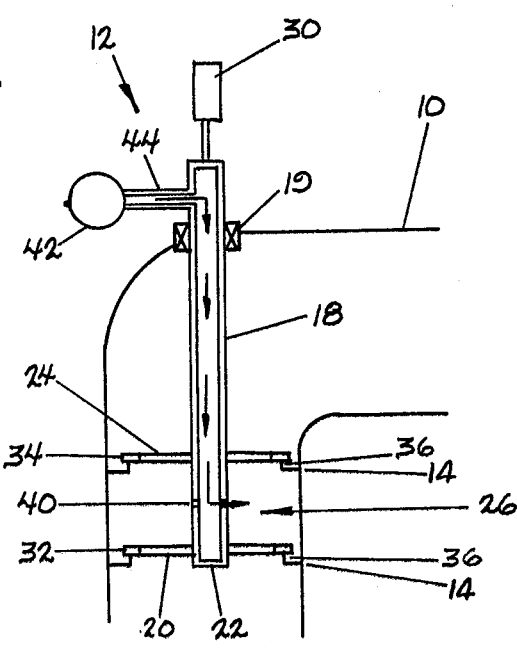
FIG. 2 is a longitudinal cross-sectional view illustrating one application of the embodiment of FIG. 1.

FIG. 2 illustrates one application of the ventilated poppet damper assembly 12. In this particular application, the flow of gas in the conduit 10, indicated by the mottled arrows, is in such a direction that it first meets the damper plate 20 and subsequently the damper plate 24. Therefore, in this application the plate 20 is the upstream damper plate and the plate 24 is the downstream damper plate. When it is desired to stop the flow of gas through the conduit 10, the rod moving means 30 is actuated to axially move the rod 18 toward the sealing seats or flanges 14 and 16, thus, concurrently moving the damper plates 20 and 24 into engagement with the sealing seats or flanges 14 and 16, respectively. To further protect against gas leaks between the damper plates 20 and 24 and their respective sealing seats or flanges 14 and 16, the transverse chamber 26 is pressurized with another gas, such as air, by the gas moving means 42 which is, in this instance, a source of pressurized gas such as, for example, an air pump. The pressurizing gas flows from the gas moving means 42, through the ventilating conduit 44 into the interior of the hollow rod 18, through the apertures 40 in the side walls of the rod and into the transverse chamber 26. The flow of this pressurizing gas is indicated by the arrows in FIG. 2. The chamber 26 is pressurized to a level above the gas pressure in the conduit 10, thus, preventing the gas in the conduit from leaking between the damper plate to sealing seat interface.

Figure 3:
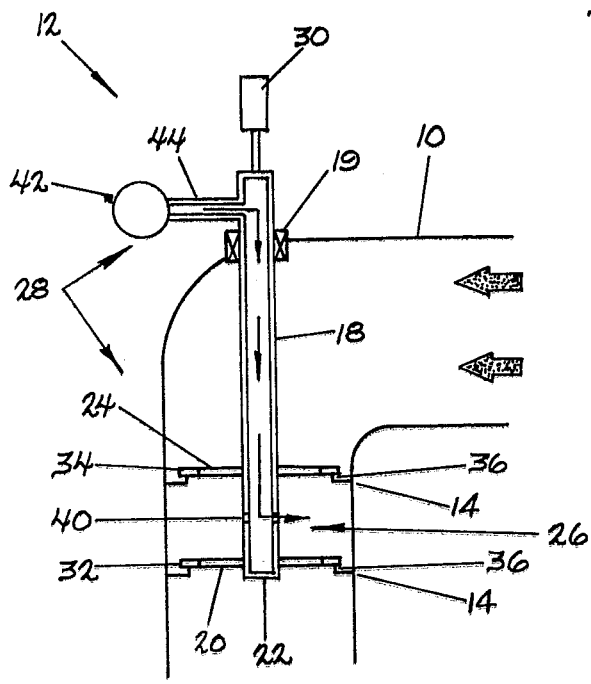
FIG. 3 is a longitudinal cross-sectional view illustrating another application of the embodiment of FIG. 1.

The application depicted in FIG. 3 differs from that depicted in FIG. 2 only in the direction of flow of the gas within the conduit 10. In all respects, however, the operation and structure of the ventilated poppet damper assembly 12 of FIG. 3 is identical with that of FIG. 2 and discussed above.

Figure 4:
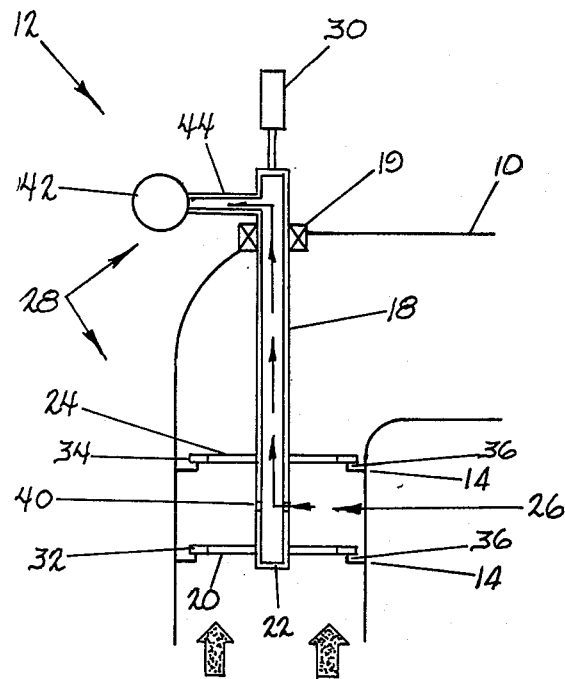
FIG. 4 is a longitudinal cross-sectional view illustrating another application of the embodiment of FIG. 1.

FIG. 4 depicts a somewhat different application of the ventilated poppet damper assembly 12. In this application the flow of gas in the conduit 10, indicated by the mottled arrows, is in such a direction that it first meets the damper plate 20 and subsequently the damper plate 24. Therefore, in this application the damper plate 20 is the upstream damper plate and the damper plate 24 is the downstream damper plate. When it is desired to stop the flow of gas through the conduit 10, the rod moving means 30 is activated to axially move the rod 18 toward the sealing seats or flanges 14 and 16, thus, concurrently moving the damper plates 20 and 24 into engagement with the sealing seats or flanges 14 and 16, respectively. To further protect against gas leaks between the damper plates 20 and 24 and their respective sealing seats or flanges 14 and 16, the transverse chamber 26 is evacuated by the gas moving means 42 which, in this instance, is, for example, a vacuum pump. Any gas from the conduit 10 which may leak past the interface between the damper plate 20 and the sealing seat 14 into the transverse chamber 26 is evacuated therefrom through the apertures 40 into the interior of the hollow rod 18, and out of the interior of the hollow rod 18 through the ventilating conduit 44 to the vacuum pump 42. This flow of gas is indicated by the arrows in FIG. 4.

Figure 5:
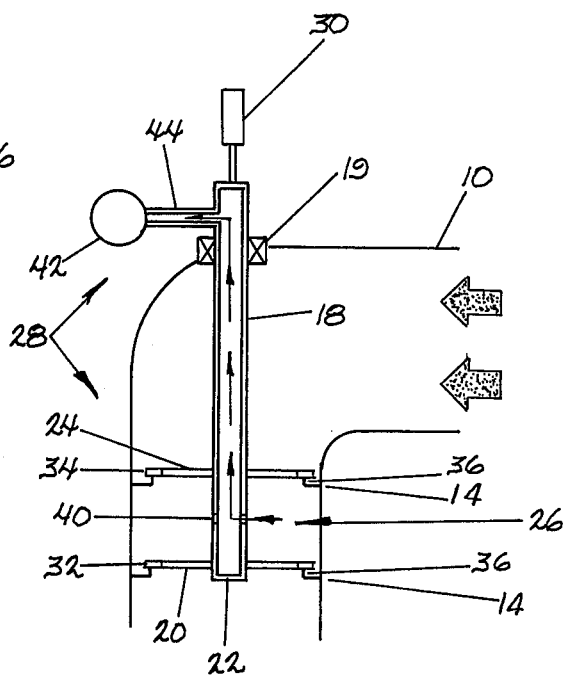
FIG. 5 is a longitudinal cross-sectional view illustrating another application of the embodiment of FIG. 1.
Figure 6:
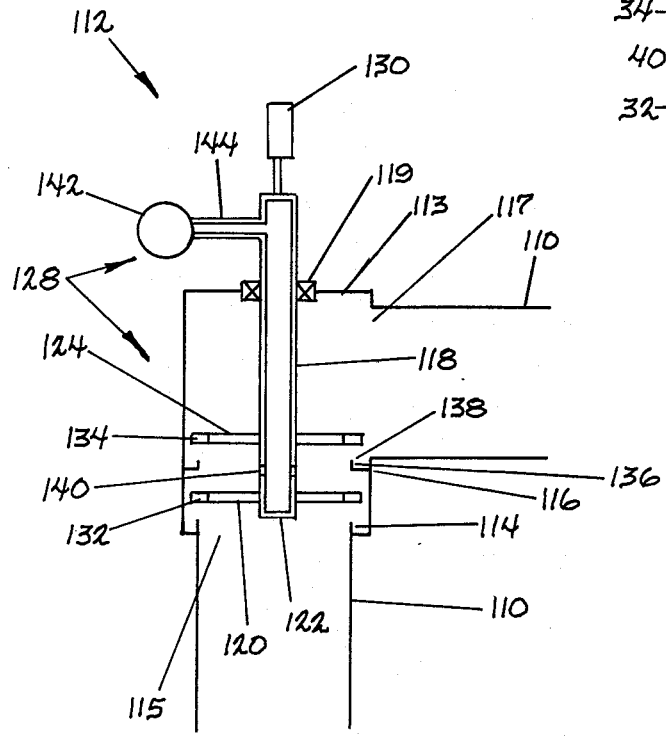
FIG. 6 is a longitudinal cross-sectional view of another advantageous embodiment of the present invention.

The application depicted in FIG. 5 differs from that depicted in FIG. 4 only in the direction of flow of the gas within the conduit 10. Because the flow of gas in the conduit 10 of FIG. 4 is reversed from that of FIG. 3, the damper plate 24 would be termed the upstream damper and the damper plate 20 and downstream damper. In all other respects, however, the operation and structure of the ventilated poppet damper assembly 12 of FIG. 5 is identical with that of FIG. 4 discussed immediately above.

Turning now to FIGS. 6–10, there is illustrated another advantageous embodiment of the present invention. There is shown a gas conveying conduit 110 having a ventilated poppet damper assembly, generally denoted as the numeral 112, disposed in the conduit 110 for selectively opening and closing the gas stream passageway through the conduit 110.

The ventilated poppet damper assembly 112 is comprised of a housing 113 having a first gas stream opening 115 in communication with the conduit 110 and a second gas stream opening 117 also in communication with conduit 110. Two spaced apart peripheral sealing seats or flanges 114 and 116 are disposed within the housing 113. One sealing seat, in this case sealing seat or flange 116, is spaced downstream, relative to the gas stream flow through the housing 113, from the other sealing seat or flange 114. A hollow close-ended activating rod 118 is coaxially disposed to the peripheral sealing seats or flanges 114 and 116 within the housing 113, and is mounted for axial movement. A damper plate 120 is coaxially disposed with the hollow rod 118 and is attached to the rod 118 proximate one of the rod ends 122 for movement with the rod 118 between an open position spaced from the peripheral sealing seat or flange 114 (see FIG. 6) to a closed position engaging the peripheral sealing seat or flange 114 (see FIGS. 7-10). Another damper plate 124 is also coaxially disposed with the hollow rod 118, but is parallel to and spaced a distrance from the damper plate 120 along the axis of the rod 118. The distance by which the damper plate 124 is spaced from the damper plate 120 corresponds to the distance that sealing seat or flange 116 is spaced from the sealing seat or flange 114. The damper plate 124 is attached to the rod 118 for movement therewith between an open position spaced from the peripheral sealing seat or flange 116 (see FIG. 6) and a closed position engaging the peripheral sealing seat or flange 116 (see FIGS. 7-10). Therefore, the damper plates 120 and 124 move as a unit with the activating rod 118. When the damper plates 120 and 124 are in the closed position, they cooperate to define a transverse chamber 126 (see FIGS. 7-10) across the housing 113.

The hollow rod 118 extends through a wall of the housing 113 to the exterior of the housing. A rod seal 119 is disposed around the rod 118 where it passes through the housing wall to create a gas tight seal to prevent the gas being conveyed in the conduit 110 from leaking out of the housing 113 past the rod 118.

The ventilated poppet damper assembly 112 further comprises means, generally denoted as the numeral 128, for venting this transverse chamber 126 through the hollow rod 118 as well as means 130 for axially moving the hollow rod 118 and, therefore, the damper plates 120 and 124 between their open position and closed position.

The damper plates 120 and 124 comprise a flexible margin 132 and 134, respectively, constituting peripheral sealing means. When the damper plates 120 and 124 are in their closed positions, the flexible margins 132 and 134 engage the peripheral sealing seats or flanges 114 and 116, respectively. Preferably, the rod moving means 130 forces the damper plates 120 and 124 against their respective sealing seats hard enough to deflect the flexible margins of the damper plates so that a tight seal is created between the flexible margins and the sealing seats.

The flexible margins 132 and 134 can be formed in any one of a number of known ways. For example, the damper plates can be tapered so that the margin is thinner than the rest of the damper plate, or a flexible gasket material can be attached to the periphery of the damper plate to extend outwardly beyond the edge of the damper plate.

The sealing seats or flanges 114 and 116 comprise a lip 136 attached to the wall of the conduit 10 and having a free edge 138 for engagement with the flexible margin 132 and 134 of the damper plate 120 and 124.

The rod moving means 130 can be any one of a number of conventional known devices such as a pneumatic or hydraulic cylinder and piston, or a solenoid.

The ventilating means 128 comprises at least one aperture 140 formed through the side wall of the hollow rod 118 between the damper plates 120 and 124 thereby providing a gas path between the transverse chamber 126 and the interior of the hollow rod 118, and gas moving means 142 in gas flow communication with the interior of the hollow rod 118 via a ventilating conduit 144.

Figure 7:
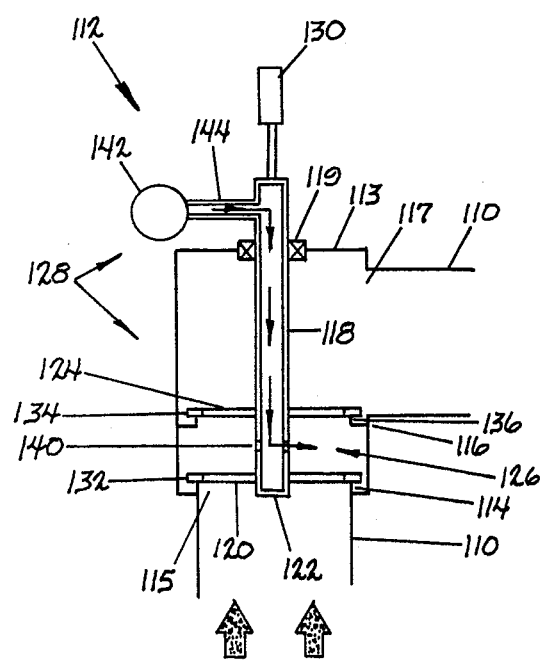
FIG. 7 is a longitudinal cross-sectional view illustrating one application of the embodiment of FIG. 6.

FIG. 7 illustrates one application of the ventilated poppet damper assembly 112. In this particular application, the flow of gas in the conduit 110, indicated by the mottled arrow, is in such a direction that it first meets the damper plate 120 and subsequently the damper plate 124. Therefore, in this application the plate 120 is the upstream damper plate and the plate 124 is the downstream damper plate. When it is desired to stop the flow of gas through the conduit 110, the rod moving means 130 is actuated to axially move the rod 118 toward the sealing seats or flanges 114 and 116, thus, concurrently moving the damper plates 120 and 124 into engagement with the sealing seat or flanges 114 and 116, respectively. To further protect against gas leaks between the damper plates 120 and 124 and their respective sealing seats or flanges 114 and 116, the transverse chamber 126 is pressurized with another gas, such as air, by the gas moving means 142 which is, in this instance, a source of pressurized gas such as, for example, an air pump. The pressurizing gas flows from the gas moving means 142, through the ventilating conduit 144 into the interior of the hollow rod 118, out of the interior of the hollow rod 118 through the apertures 140 in the side walls of the rod and into the transverse chamber 126. The flow of pressurizing gas is indicated by the arrows in FIG. 7. The chamber 126 is pressurized to a level above the gas pressure in the conduit 110, thus, preventing the gas in the conduit from leaking between the damper plate to sealing seat interface.

Figure 8:
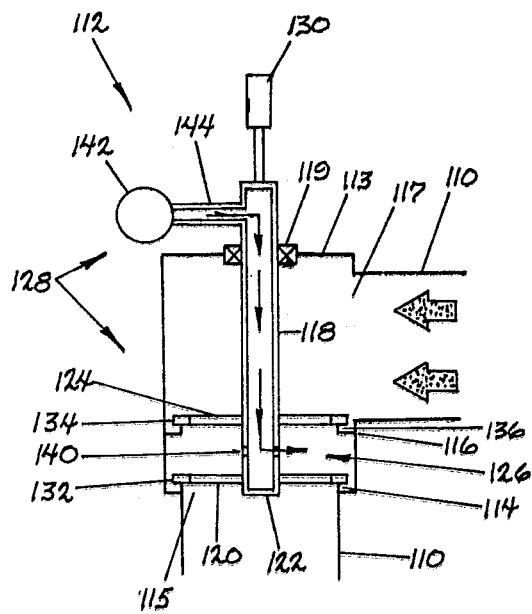
FIG. 8 is a longitudinal cross-sectional view illustrating another application of the embodiment of FIG. 6.

The application depicted in FIG. 8 differs from that depicted in FIG. 7 only in the direction of flow of the gas within the conduit 110. Therefore, the second gas stream opening 117 will be the gas stream inlet and the gas first stream opening 115 will be the gas stream outlet. Likewise, the damper plate 124 will be the upstream damper plate and the damper plate 120 the downstream damper plate. However, these differences are merely nomenclature, and the operation and structure of the ventilated poppet damper assembly 112 of FIG. 8 is identical with that of FIG. 7 discussed above.

Figure 9:
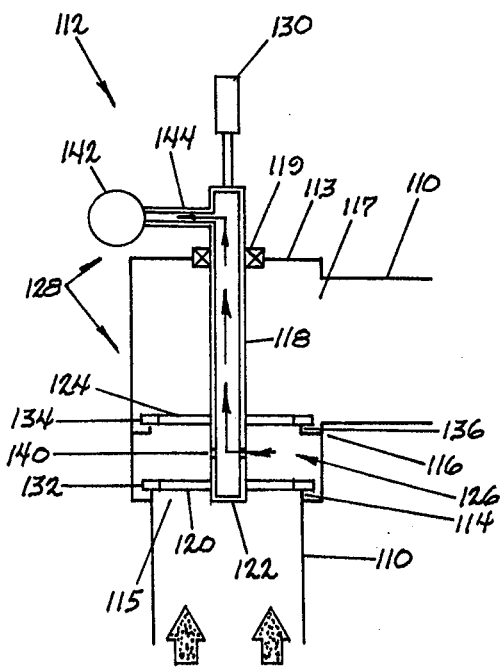
FIG. 9 is a longitudinal cross-sectional view illustrating another application of the embodiment of FIG. 6; and, FIG. 10 is a longitudinal cross-sectional view illustrating another application of the embodiment of FIG. 6.

FIG. 9 depicts a somewhat different application of the ventilated poppet damper assembly 112. In this application, as in the application of FIG. 7, the flow of gas in the conduit 110, indicated by the mottled arrow, is in such a direction that it first meets the damper plate 120 and subsequently the damper plate 124. Therefore, the damper plate 120 is the upstream damper plate and the damper plate 124 is the downstream damper plate. When it is desired to stop the flow of gas through the conduit 110, the rod moving means 130 is actuated to axially move the rod 118 toward the sealing seats or flanges 114 and 116, thus, concurrently moving the damper plates 120 and 124 into engagement with the sealing seats or flanges 114 and 116, respectively. To further protect against gas leakage between the damper plates 120 and 124 and their respective sealing seats or flanges 114 and 116, the transverse chamber 126 is evacuated by the gas moving means 142 which, in this instance, is, for example, a vacuum pump. Any gas from the conduit 110 which may leak past the interface between the damper plate 120 and the sealing seat or flange 114 into the transverse chamber 126 is evacuated therefrom through the apertures 140 into the interior of the hollow rod 118, and out of the interior of the hollow rod 118 through ventilating conduit 140 to the vacuum pump 142. This flow of gas is indicated by the arrows in FIG. 9.

Figure 10:
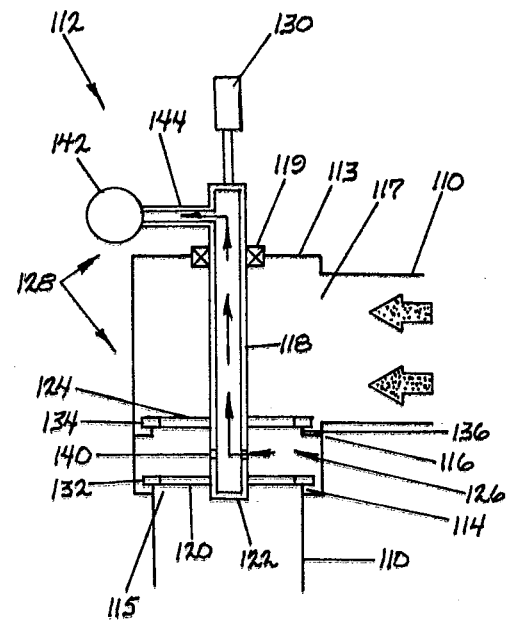

The application depicted in FIG. 10 differs from that depicted in FIG. 9 only in the direction of flow of the gas within the conduit 110. Because the flow of gas in the conduit 110 of FIG. 10 is reversed from that of FIG. 9, the second gas opening 117 is the gas stream inlet into and the first gas stream opening 115 is the gas stream outlet from the housing 113. Likewise, the damper plate 124 is the upstream damper plate and the damper plate 120 the downstream damper plate. However, these are differences in nomenclature only, and the operation and structure of the ventilated damper assembly 112 of FIG. 10 is identical with that of FIG. 9 discussed above.

It should be eminent from the various applications discussed above and illustrated in the figures that the present invention is very versatile and adaptable to various situations.

The foregoing detailed description is given primarily for clarity of understanding and no unnecessary limitations should be understood therefrom for other modifications will be obvious to those skilled in the art upon reading this disclosure and may be made without departing from the spirit of the invention or the scope of the appended claims.

I claim:

1. A ventilated poppet damper assembly for selectively opening and closing the gas stream passageway through a gas conveying conduit, the ventilated damper assembly comprising:
    a first peripheral sealing seat disposed within the conduit;
    a second peripheral sealing seat disposed within the conduit and spaced from the first peripheral sealing seat;
    a hollow close-ended activating rod coaxially disposed within the conduit and mounted for axial movement therein;
    a first damper plate coaxially disposed with the hollow rod and attached thereto proximate one of the rod ends for movement with the rod between an open position spaced from the first peripheral sealing seat and a closed position engaging the first peripheral sealing seat;
    a second damper plate coaxially disposed with the hollow rod, spaced from the first damper plate, and attached to the hollow rod for movement therewith between an open position spaced from the second peripheral sealing seat and a closed position engaging the second peripheral sealing seat;
    the first and second damper plates cooperating, in the closed position, to define a transverse chamber;
    means for axially moving the rod and, therefore, the first and second damper plates as a unit with the rod between the open and closed positions; and,
    means for ventilating the transverse chamber through the hollow rod.

2. The ventilated poppet damper of claim 1 wherein the means for ventilating the transverse chamber comprises at least one aperture through the side wall of the hollow rod located between the first and second damper plates.

3. The ventilated poppet damper assembly of claim 2 wherein the ventilating means comprises:
    gas moving means; and,
    a ventilating conduit in gas flow communication with the interior of the hollow rod and with the gas moving means.

4. The ventilated poppet damper assembly of claim 3 wherein the gas moving means comprises a source of pressurized non-toxic gas to transmit non-toxic gas into the transverse chamber through the hollow rod thereby pressurizing the transverse chamber.

5. The ventilated poppet damper assembly of claim 3 wherein the gas moving means comprises a vacuum creating means to evacuate gas from the transverse chamber through the hollow rod.

6. The ventilated poppet damper assembly of claim 1 wherein the first and second damper plates each comprise flexible peripheral sealing means for engaging the first and second peripheral sealing seats, respectively, when the first and second damper plates are in the closed position.

7. The ventilated poppet damper assembly of claim 1 wherein:
    the hollow rod extends through the wall of the gas conveying conduit to the exterior of the gas conveying conduit; and,
    a seal is disposed around the rod where the rod passes through the wall of the gas conveying conduit to create a gas tight seal between the hollow rod and the wall of the gas conveying conduit.

8. The ventilated poppet damper assembly of claim 6 wherein each of the first and second peripheral sealing seats comprise a lip having a free standing edge for engagement with the flexible peripheral sealing means of the first and second damper plates, respectively.

9. The ventilated poppet damper assembly of claim 2 wherein the hollow rod comprises a plurality of apertures through the side wall of the hollow rod located between the first and second damper plates.

10. A ventilated poppet damper assembly for selectively opening and closing the gas stream passageway through a gas conveying conduit, the ventilated poppet damper assembly comprising:
    a housing having a gas inlet opening in communication with the gas conveying conduit and a gas outlet opening in communication with the gas conveying conduit;
    a first peripheral sealing seat disposed within the housing;
    a second peripheral sealing seat disposed within the housing and spaced from the first peripheral sealing seat;
    a hollow close-ended activating rod disposed within the housing coaxial with the first and second peripheral sealing seats and mounted for axial movement;
    a first damper plate coaxially disposed with the hollow rod and attached thereto proximate one of the rod ends for movement with the rod between an open position spaced from the first peripheral sealing seat and a closed position engaging the first peripheral sealing seat;
    a second damper plate coaxially disposed with the hollow rod, spaced from the first damper plate, and attached to the hollow rod for movement therewith between an open position spaced from the second peripheral sealing seat and a closed position engaging the second peripheral sealing seat;
    the first and second damper plates cooperating, in the closed position, to define a transverse chamber;
    means for axially moving the rod and, therefore, the first and second damper plates as a unit with the rod between the open and closed positions; and,
    means for ventilating the transverse chamber through the hollow rod.

11. The ventilated poppet damper of claim 10 wherein the means for ventilating the transverse chamber comprise at least one aperture through the side wall of the hollow rod located between the first and second damper plates.

12. The ventilated poppet damper assembly of claim 11 wherein the ventilating means comprise:
gas moving means; and,
a ventilating conduit in gas flow communication with the interior of the hollow rod and with the gas moving means.

13. The ventilated poppet damper assembly of claim 12 wherein the gas moving means comprises a source of pressurized non-toxic gas to transmit non-toxic gas to the transverse chamber through the hollow rod.

14. The ventilated poppet damper assembly of claim 12 wherein the gas moving means comprises vacuum creating means to evacuate gas from the transverse chamber through the hollow rod.

15. The ventilated poppet damper assembly of claim 10 wherein the first and second damper plates each comprise flexible peripheral sealing means for engaging the first and second peripheral sealing seats, respectively, when the first and second damper plates are in the closed position.

16. The ventilated poppet damper assembly of claim 10 wherein:
the hollow rod extends through a wall of the housing to the exterior of the housing; and,
a seal is disposed around the rod where the rod passes through the wall of the housing to create a gas seal between the hollow rod and the wall of the housing.

17. The ventilated poppet damper assembly of claim 15 wherein each of the first and second peripheral sealing seats comprise a lip having a free standing edge for engagement with the flexible peripheral sealing means of the first and second damper plates, respectively.

18. The ventilated poppet damper assembly of claim 11 wherein the hollow rod comprises a plurality of apertures through the side wall of the hollow rod located between the first and second damper plates.

* * * * *